US006155453A

United States Patent [19]

Coleman et al.

[11] Patent Number: 6,155,453

[45] Date of Patent: Dec. 5, 2000

[54] PLURALITY OF INTERCONNECTED CANDY MACHINES

[76] Inventors: Thomas J. Coleman, 19170 Paddock Pl., Abingdon, Va. 24211; William K. Schlotter, IV, 117 Wateredge La., Fredericksburg, Va. 22406; Princess Ann Coleman, 19170 Paddock Pl., Abingdon, Va. 24211; Ann M. Schlotter, 117 Wateredge La., Fredericksburg, Va. 22406

[21] Appl. No.: 09/172,292

[22] Filed: Oct. 14, 1998

[51] Int. Cl.[7] .......................... A24F 15/04; G07F 11/00; G07F 11/16; B65G 59/00; B65H 3/00

[52] U.S. Cl. .......................... 221/24; 221/225; 221/268; 221/270

[58] Field of Search .......................... 221/94, 24, 2, 221/238, 225, 268, 270, 185, 95

[56] References Cited

U.S. PATENT DOCUMENTS

| | | | |
|---|---|---|---|
| 4,948,012 | 8/1990 | Snediker, Sr. et al. | 221/254 X |
| 5,528,085 | 6/1996 | Hsiang | 307/10.2 X |
| 5,673,813 | 10/1997 | Russell | 221/203 |
| 5,782,378 | 7/1998 | Hart et al. | 221/24 |
| 5,823,386 | 10/1998 | Vandeberg | 221/2 |
| 5,833,117 | 11/1998 | Kovens et al. | 221/24 |
| 5,897,022 | 4/1999 | Mann | 221/24 |
| 5,913,453 | 7/1999 | Coleman et al. | 221/24 |

*Primary Examiner*—Christopher P. Ellis
*Assistant Examiner*—Gene O. Crawford
*Attorney, Agent, or Firm*—Melvin L. Crane, Agent

[57] ABSTRACT

A plurality of different operative candy dispensers which can be interconnected as one device through which candy pieces are dispensed from a first candy dispenser and which are dispensed in order through each of the interconnected candy dispensers. Each of the candy dispensers includes a main housing, a motor, gear train, power supply, control switch, candy reservoir, exit spout from said housing and a mechanism for moving and dispensing the candy from the exit spout of the housing. Each of the separate candy dispensers are equipped with an auxiliary electrical plug or connection by which each of the candy dispensers can be connected to a master switch which when closed will bypass the control switch of each separate candy dispenser to operate all of the interconnected dispensers together.

5 Claims, 9 Drawing Sheets

PLURALITY OF INTERCONNECTED CANDY MACHINES

This invention relates to candy dispensing machines and more particularly to a plurality of interconnected candy machines which dispense pieces of candy from a first candy machine to successive candy machines.

BACKGROUND OF THE INVENTION

Heretofore separate candy machines have been used to dispense pieces of candy from a container by some mechanism. This invention is directed to a plurality of candy dispensing machines by which a piece of candy can be dispensed from a container of a first machine, then into a second machine, and from the second machine into a third machine and so forth for as many machines as one desires to connect to each other for dispensing a piece of candy.

OBJECTS OF THE INVENTION

It is an object of the invention to provide a candy dispensing system which will amuse a person by feeding a piece of candy from a first machine into a second machine and from the second machine to a third machine and on into and from a number of interconnected dispensing machines connected together. The machines are each electrically operated and include a motor driven mechanism by which a piece of candy fed from one machine is fed through an adjacent interconnected machine until the piece of candy reaches the last machine from which it is finally dispensed to the user.

The candy dispensing machines can be interconnected electrically so that a single master switch will operate all machines or the machines can be electrically connected so that separate individual machines can be operated independent of each other. For dispensing candy from a first machine and then through each machine in succession, the master switch could be used. The candy machines can be easily disconnected from each other so that a single machine or a lesser number of machines can be used for dispensing candy from one or more of the machines.

Other objects and advantages of the invention will become obvious to those skilled in the art when considered in conjunction with the drawings and following description.

DETAILED DESCRIPTION

Figure 1:
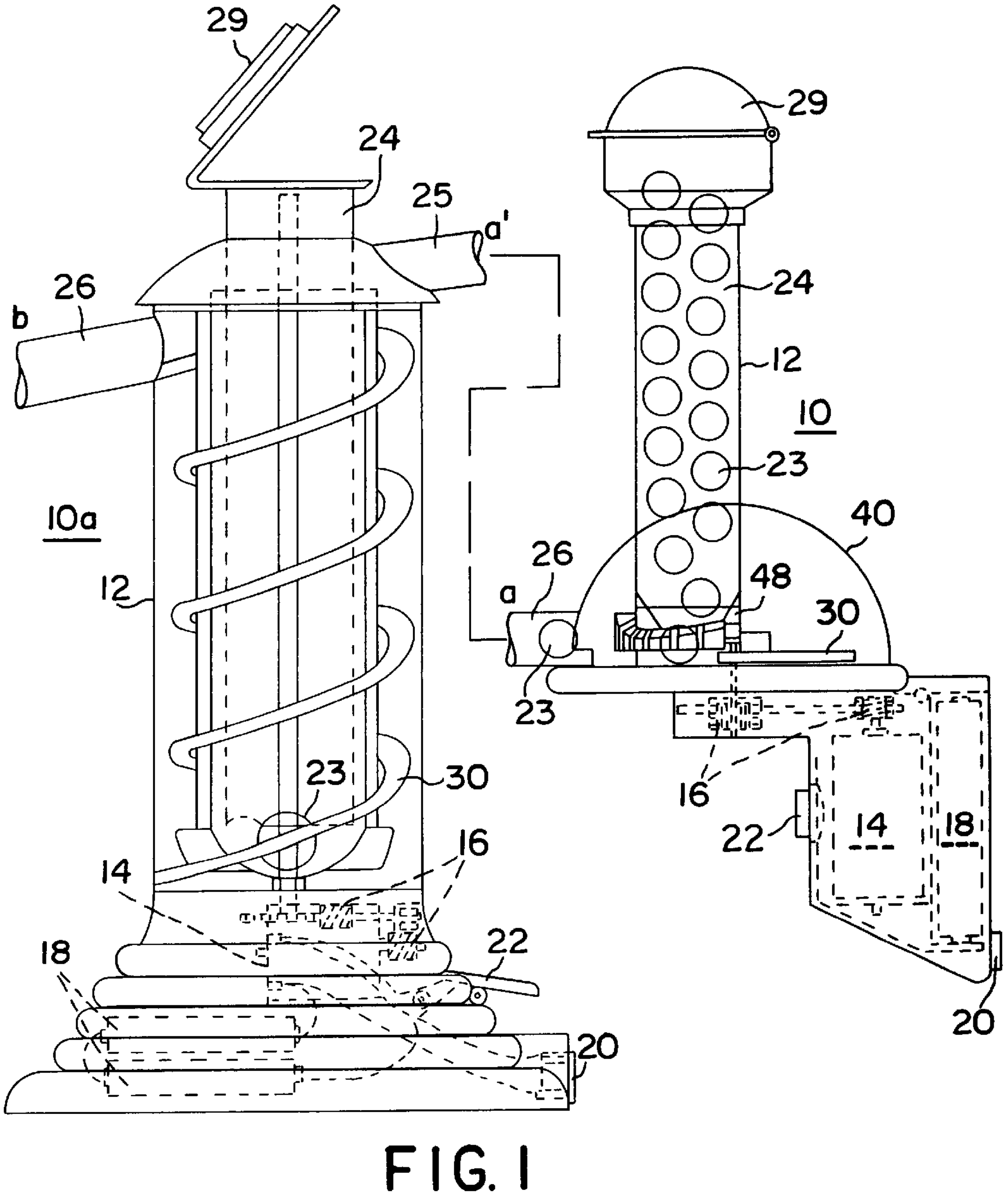
FIG. 1 illustrates a plurality of candy dispensers grouped together to feed a piece of candy from one candy dispenser to other dispensers of a group.

Now referring to the drawings, there is shown in FIG. 1 a plurality of interconnected candy dispensers by which a piece of candy in one of the dispensers can be dispensed into an adjacent dispenser which in turn dispenses the piece of candy into another dispenser and on through each of the dispensers from which the piece of candy is dispersed from the endmost dispenser. FIG. 1 has been shown on three separate sheets and interconnected by dashed lines. The outlets of the dispensers have been denoted by a, b, c, d which are connected to inlets a', b', c', d', respectively, as shown. Each of dispensers 10, 10*a*, 10*b*, 10*c* and 10*d* of the group shown in FIG. 1 have the following operative elements in common: a main housing 12, a motor 14, a gearing system 16, a power supply 18, an auxiliary power plug 20, a control switch 22, a candy reservoir 24, pieces of candy 23, a candy outlet spout 25, a candy exit spout 26, an interconnecting electrical hook-up for a one switch 28 operation shown in FIG. 2 and a mechanism 30 for moving and dispensing the candy, and a cover filler cap 29.

Figure 2:
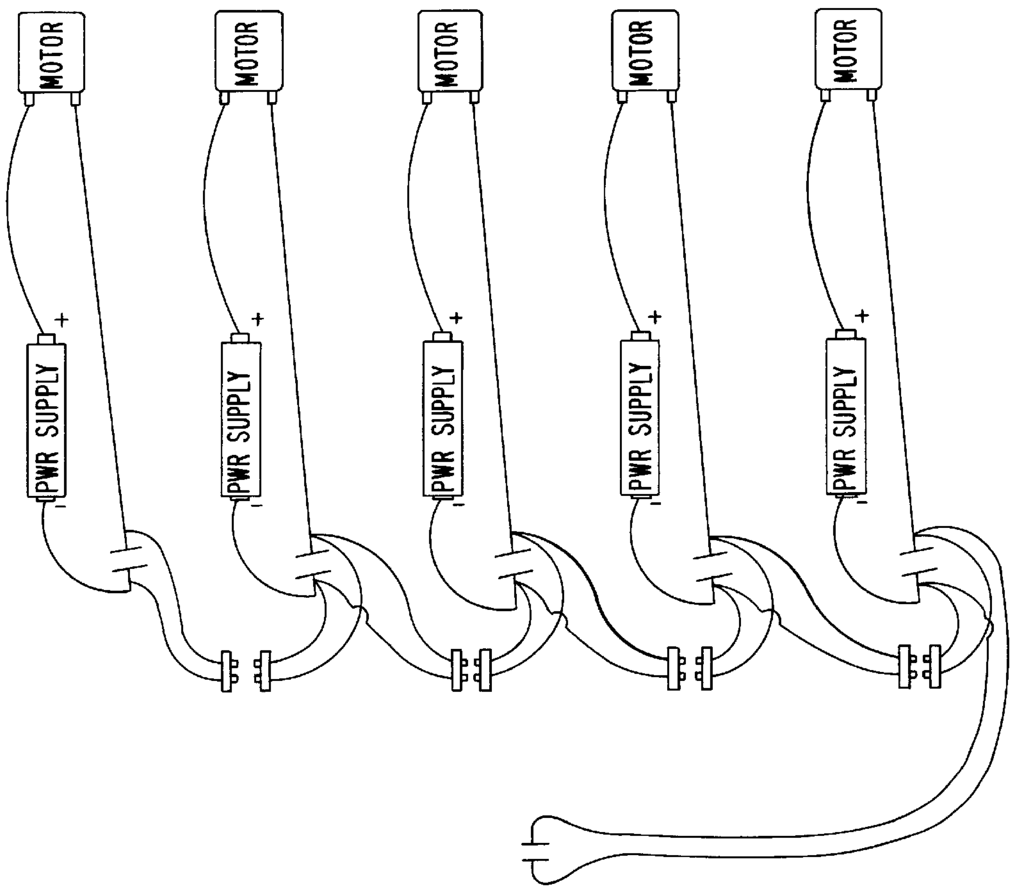
FIG. 2 illustrates a circuitry which connects the plurality of dispensers electrically in parallel with a master switch for operating all of the dispensers simultaneously.

In operation of the plurality of interconnected candy dispensers there is an interconnecting electrical circuitry, FIG. 2, by which one can operate all of the candy dispensers at the same time from a single master switch 28 or each of the candy dispensers can be operated independently by their own control switch 22. The circuitry connects each of the power supplies of each of the dispensers in parallel with the master switch 28 as shown in FIG. 2. The circuitry makes use of the power sources in each of the candy dispensers for operation by the master switch or individually by closing the switch of each separate dispenser. Operation of the plurality of dispensers is mostly for amusement rather than for dispensing pieces of candy from a particular dispenser. A piece of candy is placed in the first dispenser 10, then the master switch is closed to operate all of the dispensers simultaneously. The piece of candy will be fed from the dispenser 10 to the dispenser 10*a* and successively through each of the dispensers to the last most dispenser which will feed the piece of candy into one's hand. For greater pleasure, pieces of candy could be added to the first dispenser 10 successively and the pieces of candy can be watched as they proceed successively through each of the interconnected dispensers. If one prefers, they can disconnect the plurality of dispensers and fill each reservoir with candy and use the dispensers separately by activation of their respective switch, for separate operation the inlet and outlet spouts of the plurality of dispensers should be disconnected for dispensing candy from each dispenser separately. The plurality of candy dispensers have been shown as five. It would be obvious that a lesser or greater number of dispensers could be used. This would enable one to purchase one or any number of dispensers depending on the number of different types of dispensers available. Each of the dispensers will be described in greater detail in the following descriptions of the various types of dispensers.

Figure 3:
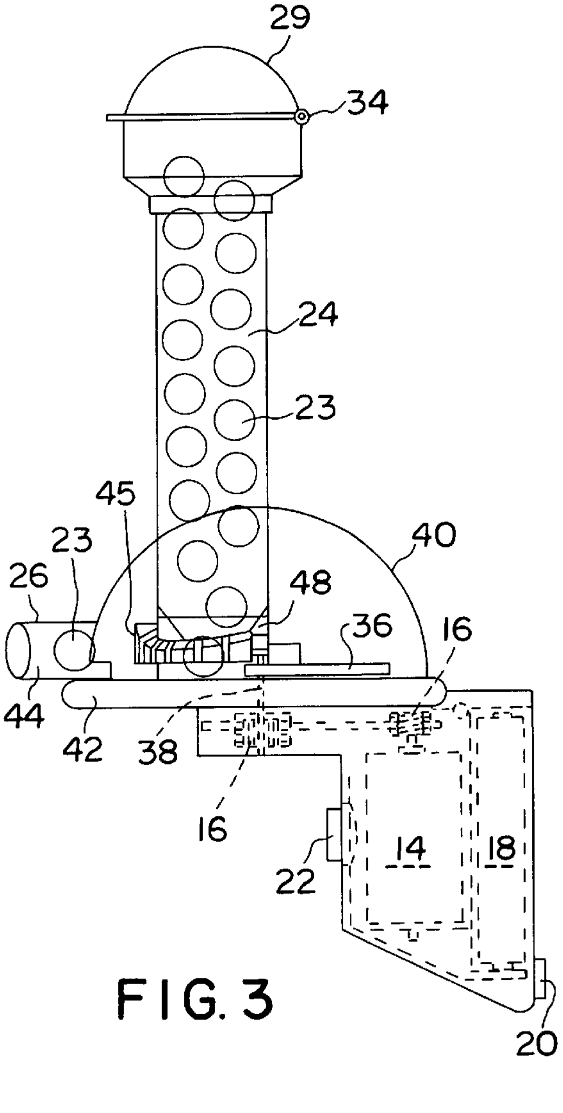
FIG. 3 illustrates a side view of a candy slider dispenser shown in FIG. 1.
Figure 4:
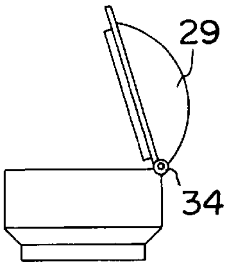
FIG. 4 illustrates a top view of the device shown in FIG. 3 showing a candy dispenser cover.

FIG. 3 illustrates the candy dispenser 10, shown separated from the group of candy dispensers. The dispenser is shown with the elements set forth above which shows the filler cap 29 which has a dome shape which is hinged at 34 as shown in FIG. 4 for loading candy or gum in the reservoir. The cap can be spring loaded so that the cap is normally in a closed position.

Figure 5:
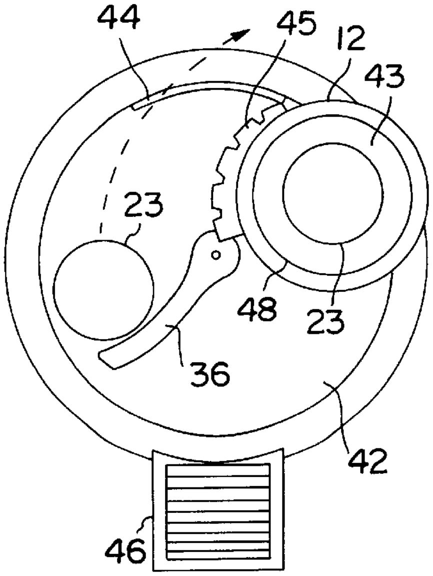
FIG. 5 illustrates a slider mechanism by which the candy pieces are dispensed from the dispenser shown in FIG. 3.

FIG. 5 illustrates a top view of the mechanism for dispensing the candy from the dispenser sown in FIG. 3. FIG. 5 more clearly illustrates a slider arm 36 which is rotatable by a spindle shaft 38 of the gearing system. The slider arm is rotatable in a dome-shaped part 40 of the housing 12. The reservoir 24 is secured at the bottom of the dome and slider base 42 so that candy pieces can be dispensed from the bottom of the reservoir via an aperture 43 and carried by the slider arm to be dispensed via an aperture 44 in the dome. The bottom of the reservoir is provided with a kicker block 45 which forces the candy toward the aperture. Shown also in figure 45 is a battery door 46 which can be opened and closed in order to replace the battery. FIG. 5 illustrates round pieces of candy in the reservoir which are dispensed at the bottom of the housing by rotation of the slider arm. The dispenser shown in FIG. 5 has guides 48 for guiding the candy in a single row from the reservoir into the dome for dispensing the balls one at a time.

Figure 6:
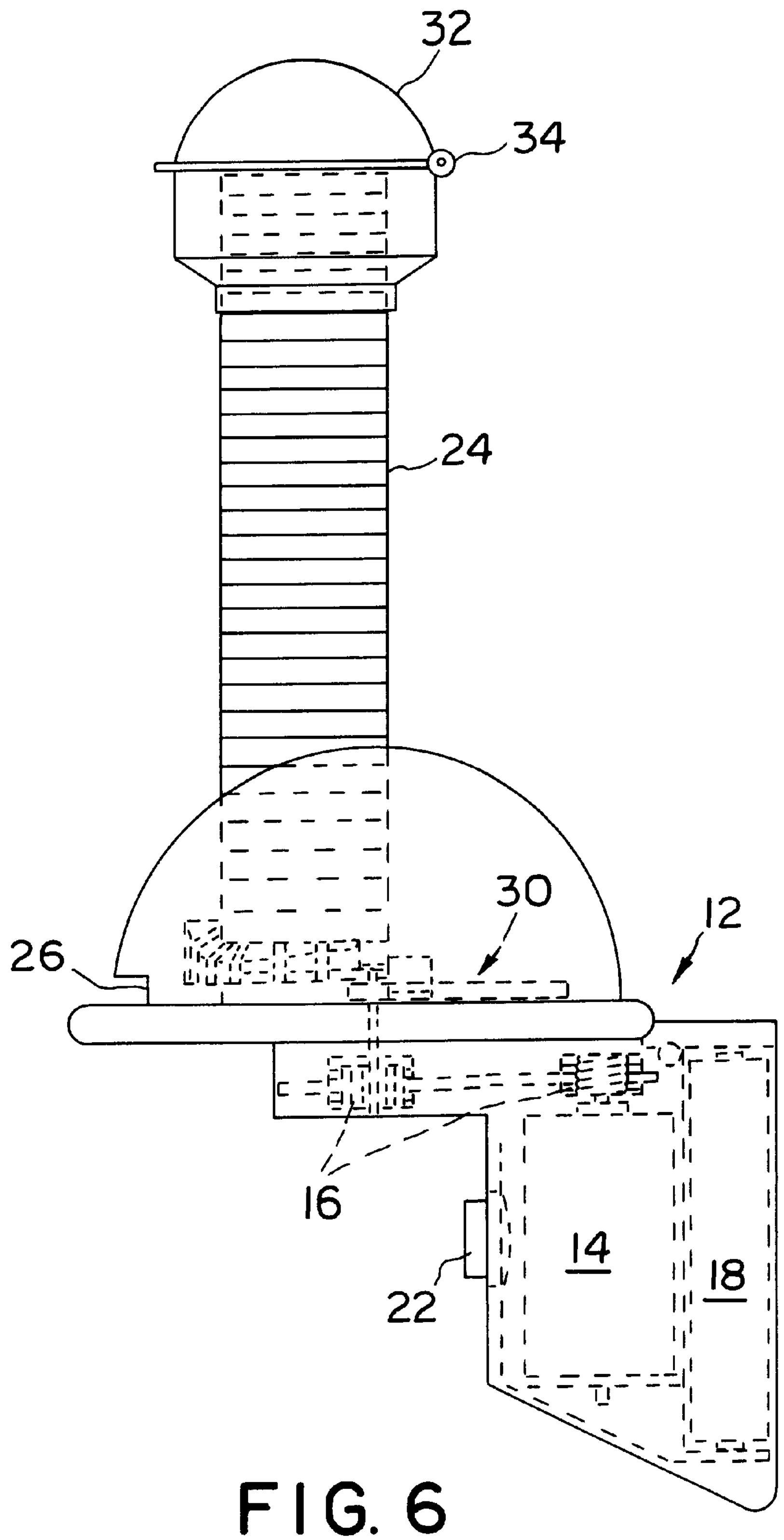
FIG. 6 illustrates a side view of a modification of the candy slider of FIG. 3.

FIG. 6 is a modification of the device shown in FIG. 3 in which flat pieces of candy are dispensed. It would be obvious that the spacing at the bottom of the reservoir will be less than the spacing in FIG. 3 so that the flat pieces can be dispensed. Otherwise, the modification of FIG. 6 is the same as for FIG. 3.

In operation of the candy slider for separate operation, the candy slider is provided with a battery source and then the reservoir is loaded with candy. When a piece of candy is desired, the power switch or button is pushed to start the motor. The motor turns the slider arm which during rotation slides the bottommost piece of candy from the reservoir and out of the aperture into one's hand. The motor can be operated to dispense one or more pieces of candy in succession during the operation of the motor.

Figure 7:
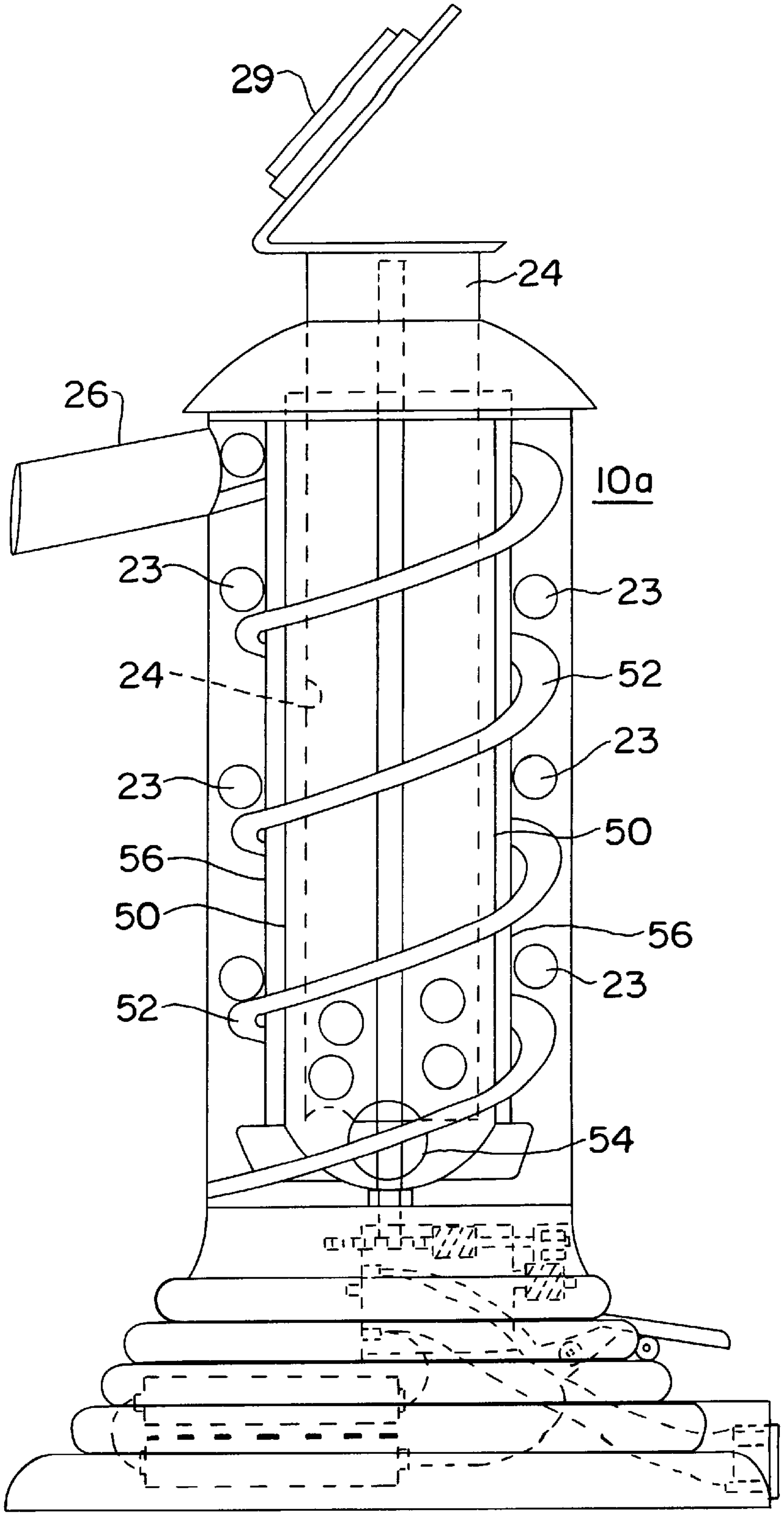
FIG. 7 illustrates a side view of a candy dispenser shown in FIG. 1.

FIG. 7 illustrates a side view of the dispenser shown in FIG. 1 as dispenser 10*a* which illustrates the relative operative parts: the power source, motor, gearing system, auxiliary power plug, main housing, reservoir, and power switch. FIG. 7 includes a rotating cylinder 50 surrounded by a stationary spiral track 52, both of which are located between the cylindrical main housing and cylindrical reservoir. The reservoir is provided with an outlet 54 at the bottom of the reservoir through which candy is permitted to be directed onto the lower end of the stationary spiral track. The rotating cylinder is provided with oppositely disposed vertical guiding push rods 56 which push the candy along the guiding track up to an outlet opening and exit spout 26. The upper end of the reservoir is provided with a cover 29 which may be hinged by a spring loaded hinge in order to close the lid in a normal closed position. In operation, candy pieces (shown as balls) are loaded into the reservoir at the upper end. The balls fall by gravity to the bottom of the reservoir and emerge through the outlet 54 onto the lower end of the stationary spiral track. The switch is closed to activate the motor. The motor rotates the rotating cylinder and as the cylinder rotates, the guiding push rods move the candy balls along the spiral guide track and up to the outlet. The candy then leaves the device via the outlet spout. As long as there is candy in the reservoir and as long as the motor rotates the cylinder, the candy will be dispensed from the spout.

Figure 8:
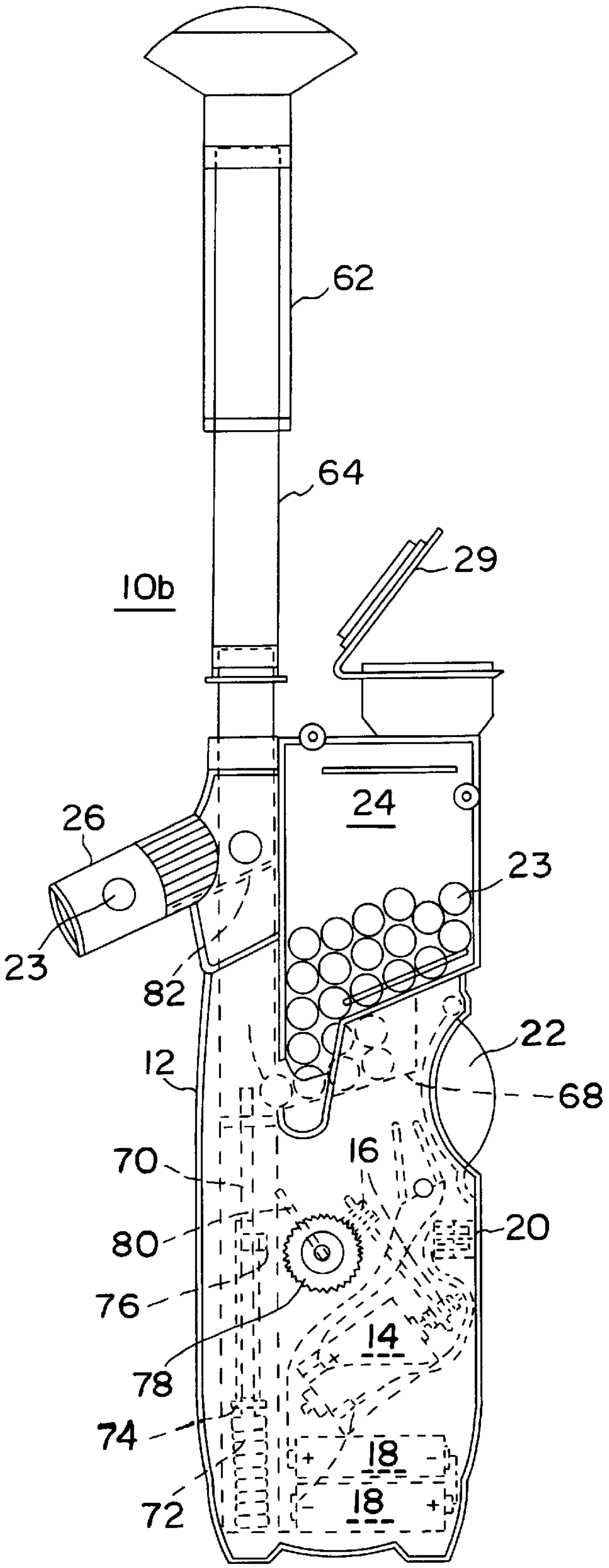
FIG. 8 illustrates a side view of another candy dispenser set forth in FIG. 1 which is shown as a separate dispenser.

FIG. 8 illustrates a side view of the candy dispenser 10*b* set forth in FIG. 1 and shown as a separate dispenser. As shown, FIG. 8 includes those elements set forth for FIG. 1 which also includes additional features. The candy dispenser shown by FIG. 8 illustrates a housing which includes the power source, motor, gearing system and a control switch for the motor. The housing includes telescoping tubes 62, 64 which extend upwardly from the main housing. The candy dispenser includes a reservoir 24 with a fill cap 29 through which the candy pieces are filled into the reservoir. The bottom of the reservoir includes a feed trough 68 which feeds the candy pieces one at a time to be ejected by an ejection mechanism. The ejection mechanism includes a propulsion rod 70 which is secured at its lower end to a spiral spring 72 which is secured below a spring stop 74. In operation, the motor rotates a gear 78 which has a lever arm 80 secured thereto and rotatable therewith. The lever arm 80 contacts a slide bar 76 as the gear 78 is rotated. The lever arm forces the slide bar and propulsion rod 70 downwardly against the spring which compresses the spring. As the spring is forced downwardly, a piece of candy 23 is moved to the passage above the propulsion rod 70. As the gear is rotated and the lever forces the propulsion rod downward, the lever moves past the slide bar to release the slide bar and the propulsion rod. The propulsion rod hits the piece of candy and forces the candy piece upwardly past a flexible tab 82 just below the candy exit spout and into the telescoping tubes. The spring is stopped by a spring stop 84 which in turn stops the upward movement of the propulsion rod. The candy piece that is forced upwardly into the telescoping tubes falls back onto the flexible ejection tube and then exits through the exit spout. If the motor continues to operate, the motor rotates the gear and lever arm which then contacts the slide bar again to reload the propulsion rod for ejecting another piece of candy.

Figure 9:
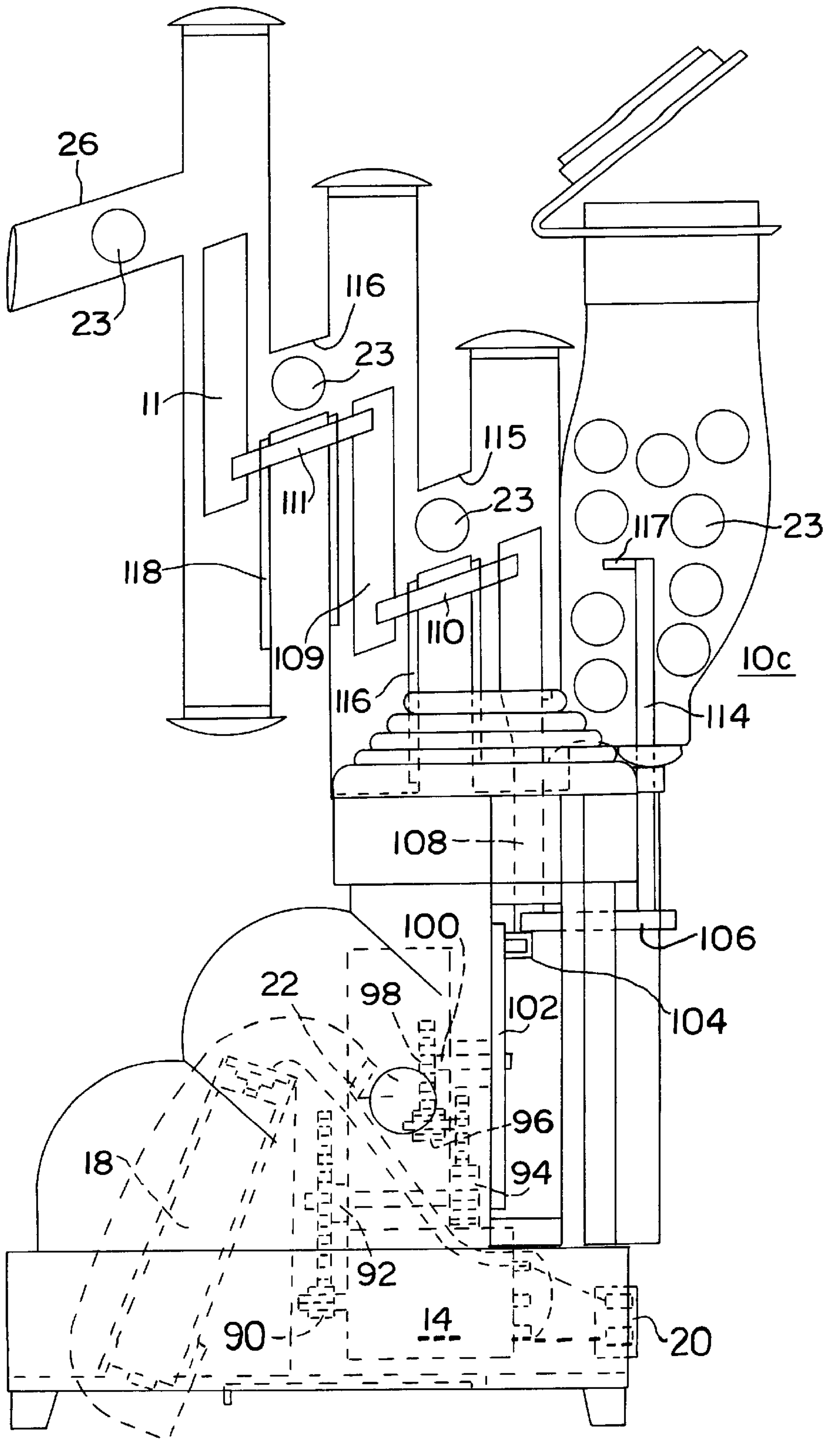
FIG. 9 illustrates a side view of another dispenser set forth in FIG. 1 which is shown as a separate dispenser.

FIG. 9 illustrates a candy stepper which is shown in FIG. 1 and illustrated as FIG. 10*c*. The device includes the parts as set forth for each of the dispensers shown in FIG. 1. The candy stepper is more complicated than the previously described dispensers. The motor drives a main drive gear 90 which drives gears 92 and 94 in a gear box which in turn drive a gear 96 which then drives a gear 98. The gear 98 is on a shaft 100 which drives a cam gear 102 which includes a cam hub 104. The cam moves the hub vertically which forces a push rod 106 and a main drive rod 108 up and down in the housing. The main drive rod drives a primary drive rod 109 via a cross piece 110 secured to the upper end of the main drive rod. The primary drive rod drives a secondary drive rod 112 that is secured to the upper end of the primary rod via a second cross piece 111 which is secured to the upper end of the primary drive rod. The cross pieces 110 and 111 move up and down in vertical slots 116 and 118 as the main drive rod moves up and down because of the rotating cam.

In operation, the reservoir is filled with candy pieces. The motor is activated by closing the control switch. The motor turns the gearing system which rotates the cam, as the cam is rotated, the cam hub 104 moves the main drive rod 108 up and down and a candy agitator 114 is moved up and down via the push rod 106. When the main drive rod comes down below the candy outlet, one piece of candy will move from the reservoir to a position above the main drive rod. As the main drive rod moves downwardly to its lowest position below the candy outlet, the primary drive rod and the secondary drive rod move downwardly with the main drive rod. The primary and secondary drive rods move downwardly below openings 115 and 116 and candy pieces that have been moved from the reservoir are moved onto the primary and secondary drive rods. Initially when the main primary and secondary drive rods move downwardly, a piece of candy moves to a position on top of the main drive rod. The main drive rod then moves the piece of candy into a first opening 115 along the primary drive rod. Then as the main, primary and secondary drive rods move down a second time, the first piece of candy moves on top of the primary drive rod and a new piece moves on top of the main drive rod. The drive rods are then moved upwardly and the first piece of candy moves to a second opening 116 and the second piece of candy moves into the first opening 115. The drive rods then move downwardly and the first piece of candy moves from the second opening to a position on top of the secondary drive rod, the second piece of candy moves to a position on top of the primary drive rod, and a third piece moves from the reservoir to a position on top of the main drive. The drive rods are then moved upwardly together. The first piece of candy is moved to the exit spout 26, the second piece of candy is moved to the second opening 116, the third piece of candy is moved to the first opening 115. With further movement of the drive rods downwardly and upwardly, successive pieces of candy will be stepped upwardly to the next drive rod and out via the exit spout. As the push rod 106 moves up and down, the push rod moves the candy agitator 114 up and down and as the agitator moves downwardly, the agitator has an ejection tab 117 thereon which ejects a piece of candy from the reservoir. Thus, the dispenser functions as a stepper in order to dispense the candy.

Figure 10:
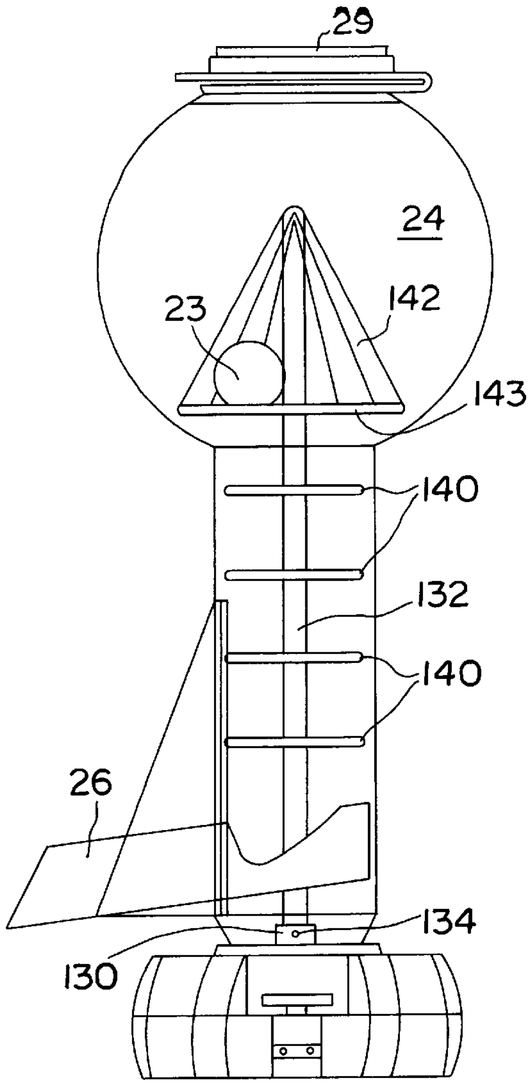
FIG. 10 illustrates a side view of still another dispenser set forth in FIG. 1 which is shown as a separate dispenser.
Figure 12:
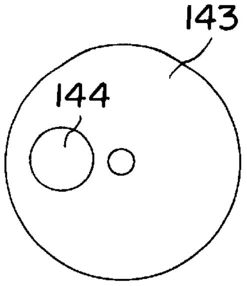
FIG. 12 illustrates a view of a disk with an aperture for dispensing candy pieces from a reservoir.
Figure 13:
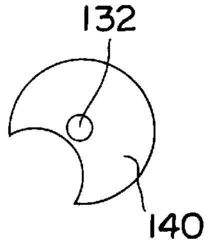
FIG. 13 illustrates a view of a rotatable slotted disk which permits the candy pieces to be dispensed through the housing.
Figure 11:
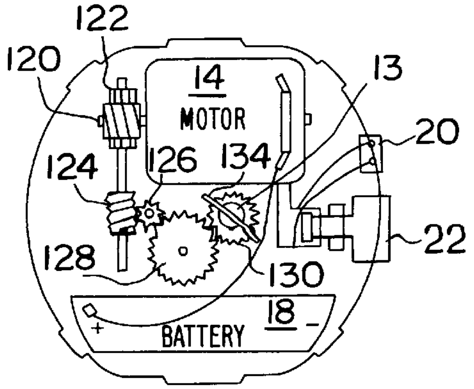
FIG. 11 illustrates a layout of the motor, battery, switch and gearing arrangement for rotating the candy dispensing disk for the dispenser shown in FIG. 10.
Figure 14:
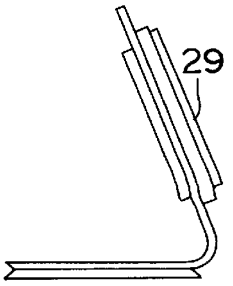
FIG. 14 illustrates a cover for the dispenser shown in FIG. 10.

FIGS. 10–13 illustrate a candy machine dispenser shown in FIG. 1 as dispenser **10*d* which as described below includes the parts set forth for each of the dispensers in FIG. 1 and also further parts which are more specifically set forth. As shown, FIG. 10 illustrates a side view which illustrates the relative parts. FIG. 11 illustrates a layout of the motor 14, drive gear 120, driven gears 122, 124, a second drive gear 126, an idler gear 128, and a driven gear 130 which is secured to a drive shaft 132. The driven gear has an upper end flange 134 which receives a lower end of the drive shaft 132 which extends vertically through the housing. The lower end of the drive shaft is secured to the flange by use of a pivot pin 134. The drive shaft extends through the housing and has secured thereto spaced slotted disk 140, FIG. 13, and a candy piece agitator 142 which is located in the reservoir. The bottom 143 of the agitator 142 has an aperture 144** through which a piece of candy is dispensed from the reservoir and which falls onto the uppermost slotted disk. As the shaft is rotated, the candy pieces dispensed from the reservoir drop in turn on each of the slotted disks and are dropped successively from one slotted disk to the next disk and finally out of the exit tube.

In operation, candy such as round balls are added to the reservoir. The switch is closed to operate the motor. The motor drives the gear train and the drive gear rotates the shaft which rotates the candy agitator in the reservoir and the slotted disk. A piece of candy will pass through the aperture in the bottom disk of the agitator and fall onto the uppermost disk on the shaft. The piece of candy then falls onto the next slotted disk in succession and at the same time other pieces will be dispensed from the reservoir. The pieces of candy will drop in succession through the respective slotted disk and finally be dispensed through the exit tube. The motor can be stopped after the desired number of pieces of candy have been dispensed.

Figure 15:
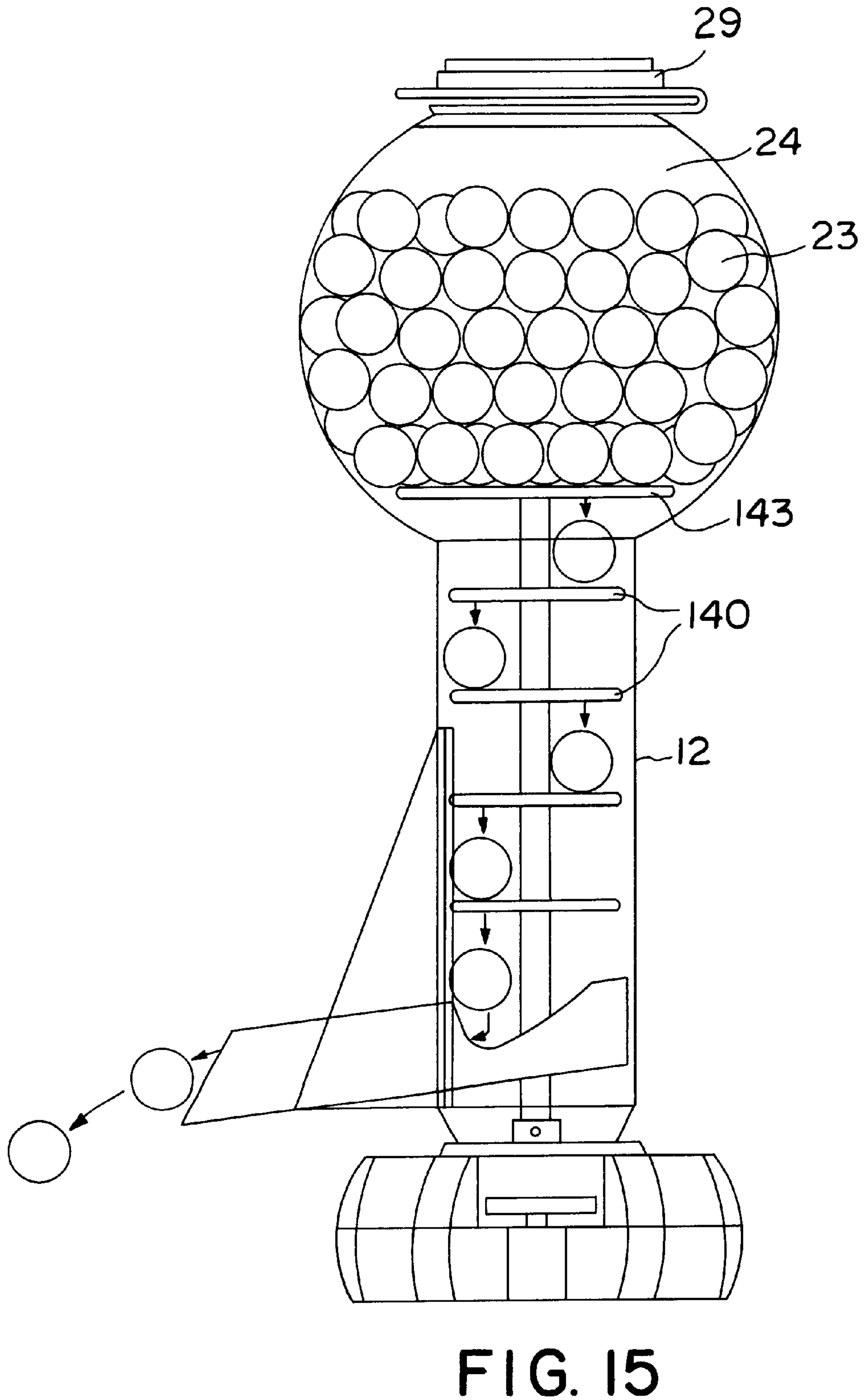
FIG. 15 is a modification of the dispenser shown in FIG. 10.

FIG. 15 is a modification of the dispenser shown in FIG. 10. The modification does not include a conical dispenser in the reservoir and the bottom plate 143 of the dispenser has an aperture 144 through which the candy pieces are dispensed from the reservoir.

In carrying out the invention, each of the candy dispensers can be made of plastic without any sharp corners or surfaces by which a person could be injured. In describing the dispensers,

We claim:

1. A plurality of interconnected candy dispenser devices comprising:

at least first and second interconnected adjacent candy dispensers, each of said first and second adjacent candy dispensers having a reservoir, said first interconnected candy dispenser having an outlet connected to a reservoir of said adjacent candy dispenser, and said second candy dispenser having an outlet for dispensing pieces of candy.

2. A plurality of interconnected candy dispensers as set forth in claim 1, in which each of said first and second candy dispensers include a power supply, a motor, a gear system driven by said motor, a control switch for controlling operation of said motor, an output spout for each of said candy dispensers, means operated by said gearing system for dispensing candy pieces from said candy reservoir to the output spout, and means for connecting an output spout of said first candy dispenser to said reservoir of said second candy dispenser.

3. A plurality of interconnected candy dispensers as set forth in claim 2, in which each of said candy dispensers includes an electrical conductor control system connected electrically in parallel across the control switch of each of said candy dispensers, and said electrical conductor control system includes a master switch for controlling all candy dispensers simultaneously.

4. A plurality of interconnected candy dispensers as set forth in claim 2, in which each of said first and second interconnected candy dispensers are operative to dispense one piece of candy at a time.

5. A plurality of interconnected candy dispensers as set forth in claim 4, in which each of said candy dispenser includes an electrical conductor control system connected electrically in parallel across the control switch of each of said candy dispensers, and said electrical conductor control system includes a master switch for controlling all candy dispensers simultaneously.

* * * * *